June 25, 1968        G. FLÜGEL        3,389,622
TONGS-LIKE GADGET FOR LOOSENING SCREW CAPS OF CONTAINERS
Filed Feb. 7, 1967
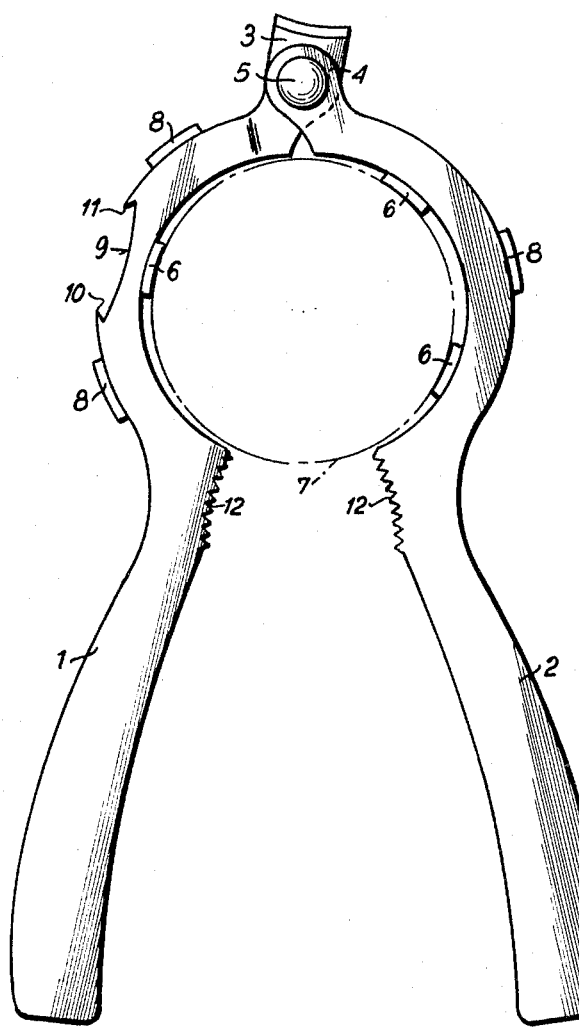
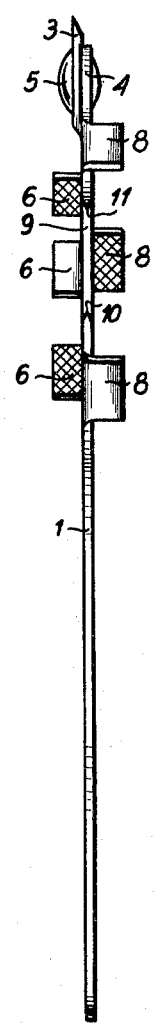
INVENTOR
Günter FLÜGEL
BY
Lowry Rinehart
his ATTORNEYS.

United States Patent Office 3,389,622
Patented June 25, 1968

3,389,622
TONGS-LIKE GADGET FOR LOOSENING
SCREW CAPS OF CONTAINERS
Günter Flügel, 3 Kopernikusweg, Solingen, Germany
Filed Feb. 7, 1967, Ser. No. 614,451
Claims priority, application Germany, Feb. 12, 1966,
F 48,412
5 Claims. (Cl. 81—3.1)

ABSTRACT OF THE DISCLOSURE

A tongs-like gadget for loosening screw caps of containers. The device includes a pair of arms bent outwardly at their upper ends to form an annular head. A plurality of projections are connected at the inner and outer circumferences of the head. The projections at the inner circumference extend at substantially right angles to the arms and all extend in the same direction to form a first set of clamping jaws. A second set of clamping jaws is formed by the plurality of projections all extending in the same direction at the outer circumference of the annular head.

Background of the invention

This invention relates to a tongs-like gadget for loosening screw caps of containers, particularly such ones containing foodstuffs.

Tongs-like gadgets are already known which serve for opening cans with pull-off caps and which consist of a pair of arms which are bent outwardly at their upper ends so as to form an annular head and which are pivotable about a rivet at the end of the head. At the inner circumference of the head the arms are provided with hook-like equidirectional clamping jaws which are arranged at an obtuse angle with respect to the arms. For loosening the closure cap the clamping jaws of the gadget are engaged under the bent rim of the cap, whereupon the surface of the base portion of the can is so deformed by exerting pressure upon the arms of the gadget that the cap comes loose of the base portion of the can. Such gadgets are, however, not suitable for opening containers having base portions which do not permit of deformation, such as glass jars, which are increasingly used for canning, particularly for canning foodstuffs. Moreover, the known gadgets are disadvantageous in that they can only be used for a small range of can sizes.

It is an object of the present invention to design the tongs-like gadget of the above-described type in such a manner that it can be used for loosening screw-caps of containers by rotary motion.

It is another object of the invention to enlarge the range of application of the gadget in view of the different sizes of containers, i.e., sizes of closure caps.

To attain these objects, the present invention is characterized in that the gadget is likewise provided with clamping jaws at the outer circumference of its annular head, which clamping jaws extend oppositely to the clamping jaws arranged at the inner circumference of the head, both the clamping jaws at the inner circumference of the head and the clamping jaws at the outer circumference forming right or substantially right angles with the arms of the gadget.

For loosening the closure cap of a container the gadget is applied to the bent rim of the closure cap either with the one or the other clamping jaws, depending on the size of the container, whereupon it is turned round while exerting pressure upon the arms, in the case of a screw cap the turning movement being effected in opening direction, whereby the closure cap is loosened without much effort being required for this purpose.

Brief description of the drawings

One embodiment of the invention will now be described by way of example and with reference to the accompanying drawing, in which:

FIG. 1 is an elevational view of a gadget according to the invention, and

FIG. 2 is a side elevational view thereof.

Description of the preferred embodiments

FIG. 1 shows a gadget comprising two arms 1 and 2 which at their upper ends are bent outwardly so as to form an annular head. At their upper ends the arms 1 and 2 are provided with outwardly directed extensions 3 and 4. The extension 3 is cranked, somewhat longer than the extension 4 and of concave shape at its chamfered free end so as to be usable for opening grooved jars. With their extensions 3 and 4 the arms 1 and 2 rest one upon the other and are pivotable about a rivet 5. At the inner circumference of the annular head of the gadget clamping jaws 6 are arranged at right angles to the arms 1 and 2, said clamping jaws all extending in the same direction and being formed by cutting out and by bending. The gadget is intended to engage with the clamping jaws 6 the bent rim of a cap 7 to be loosened and indicated in dot and dash lines in FIG. 1. Furthermore, at its outer circumference the annular head is provided with clamping jaws 8 which are likewise formed by cutting out and by bending and which, as can be seen from FIG. 2, extend in a direction opposite to that of the clamping jaws 6, likewise forming right angles with the arms 1 and 2. The clamping jaws 8 serve to loosen closure caps which are too large for being gripped by the clamping jaws 6. When applying the clamping jaws 8 to the bent rim of the closure cap to be loosened, the gadget rests with its arms 1 and 2 on the cap without being hindered by the hinge connection of the arms. The sides of the clamping jaws 6 and 8 which are facing the closure cap to be loosened are provided with roughened surfaces so as to increase the frictional resistance between the clamping jaws 6 and 8 and the rim of the closure cap when loosening the cap. At its outer circumference the head of the gadget is further provided with a cutout 9 defining hook-shaped points 10 and 11. If, as a result of too high a vacuum in a container, the gadget fails to loosen the closure cap of the container, the points 10 and 11 of the gadget are engaged under the bent rim of the closure cap and the closure cap is slightly lifted, whereby the vacuum is canceled. The closure cap can then be easily removed from the container by means of the gadget. In the same way the points 10 and 11 may serve to loosen pressed-on closure caps by disengaging part of the bent rim of the closure cap from the surface of the base portion of the container and thereby canceling the vacuum, whereupon the closure cap can be removed by hand. Below the annular head of the gadget the arms 1 and 2 are provided with two opposite toothed recesses 12 and 13 by means of which e.g., bottle closures may be removed.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description and all changes which come within the means and range of equivalency of the claims are therefore intended to be embraced therein.

I claim:

1. A tongs-like gadget for loosening screw caps of containers comprising:
    (a) a pair of arms bent outwardly at thier upper ends to form an annular head, (b) a means piovtally connecting said arms at the end of the head,
(c) a plurality of projections connected at the inner circumference of the head extending at substantially right angles to said arms and in the same direction to form a first set of clamping jaws,
(d) a plurality of projections connected at the outer circumference of the annular head extending at substantially right angles to said arms and in the same direction to form a second set of clamping jaws, the direction of said second set of clamping jaws being opposite to said first set of clamping jaws.

2. A gadget as claimed in claim 1, wherein the connecting means is a rivet and the upper ends of the arms are each formed with an extension with which the arms rest upon each other and are pivotable about the rivet.

3. A gadget as claimed in claim 2, wherein the extension of one of the arms of the gadget is cranked so that, when applying the clamping jaws arranged at the outer circumference of the head, the gadget rests on the closure cap without being hindered by the hinge connection of the arms.

4. A gadget as claimed in claim 3, wherein the extension of one of the arms of the gadget projects beyond the extension of the other arm and is of concave configuration at its chamfered free end so as to serve as an opener for grooved jars.

5. A gadget as claimed in claim 4, wherein a cutout defining points is provided at the outer circumference of the head of the gadget, said points being adapted to engage under the bent rim of the closure cap and to lift the latter in order to cancel the vacuum within the container.

References Cited

UNITED STATES PATENTS

| 2,523,544 | 9/1950 | Stamp | 81—3.4 X |
| 1,515,395 | 11/1924 | La Londe | 81—3.4 X |
| 2,729,125 | 1/1956 | Kreanowski | 81—3.44 X |
| 1,884,643 | 10/1932 | Forbes | 81—5.1 X |
| 3,204,494 | 9/1965 | Schmidlechner | 81—3.44 |

FOREIGN PATENTS 615,800   1/1949   Great Britain.

JAMES L. JONES, JR., *Primary Examiner.*